United States Patent [19]

Gurley

[11] 4,227,506
[45] Oct. 14, 1980

[54] INTERNAL COMBUSTION ENGINE

[76] Inventor: James R. Gurley, Rte. 5, Box 42, Rutherfordton, N.C. 28139

[21] Appl. No.: 5,964

[22] Filed: Jan. 24, 1979

[51] Int. Cl.³ .............................................. F02B 53/00
[52] U.S. Cl. ................................ 123/227; 418/61 R
[58] Field of Search ............... 123/226, 227, 228, 229, 123/231, 242, 221, 223; 418/61 R

[56] References Cited

U.S. PATENT DOCUMENTS

| 336,144 | 2/1886 | Nash | 418/61 R X |
|---|---|---|---|
| 1,969,651 | 8/1934 | Kretschmer | 418/61 R |
| 3,812,828 | 5/1974 | Griffiths | 123/242 X |

FOREIGN PATENT DOCUMENTS

| 164947 | 12/1949 | Australia | 123/242 |
|---|---|---|---|
| 453386 | 11/1949 | Italy | 123/228 |

Primary Examiner—Michael Koczo
Attorney, Agent, or Firm—Luke J. Wilburn, Jr.; Wellington M. Manning, Jr.

[57] ABSTRACT

A four-cycle internal combustion engine comprises a housing defining an internal compartment having one or more peripheral lobes, an inner body mounted in the housing for non-rotational orbital movement and having a plurality of peripheral lobes corresponding in number to the number of compartment lobes, and with a peripheral recess in the inner body between inner body lobe. A movable wall member is mounted for movement in each inner body peripheral recess and defines with the housing and inner body, a variable-volume fluid intake and compression chamber. The inner body is mounted in the housing compartment so that each of its peripheral lobes moves in a circular orbit into a respective one of the compartment lobes during movement of the inner body, and the inner body lobe, housing, and movable wall member define a variable-volume power chamber and exhaust chamber in each of the compartment lobes during movement of the inner body. The inner body is operatively connected to a power output shaft to impart rotary motion thereto during orbital movement of the inner body, and the peripheral wall of each inner body lobe is configured so as to impart forces of combustion in the power chamber at a substantially right angle to the crank angle of the power output shaft during the major portion of the power cycle of the engine. The housing is provided with intake and exhaust port means communicating with the internal compartment, and passageway means are located in the inner body and housing to intercommunicate the intake and compression chamber with the intake port means and the power chamber during a portion of orbital movement of the inner body, and to communicate the exhaust chamber with the exhaust port means during a portion of the movement of the inner body.

6 Claims, 7 Drawing Figures

INTERNAL COMBUSTION ENGINE

This invention relates to an internal combustion engine and, more particularly, to an improved four-cycle internal combustion engine of the eccentric piston type.

Numerous designs of internal combustion engines have been proposed, developed and employed over the years. Since the early advent of the conventional reciprocating piston engine, technology has been directed to ways to reduce engine size, weight and cost in relation to power output, as well as to increase efficiency and reduce polluting emissions of the internal combustion engine. One approach in the effort to more efficiently convert combustion energy into rotational motion of a drive shaft has been the development of the rotary engine which in its basic arrangment, employs a rotor element having plural peripheral faces and apices mounted for eccentric rotation within a housing, with the apices sweepingly engaging the inner surfaces of the housing during rotor movement to divide the same into respective variable-volume intake, compression, combustion and expansion chambers.

The reciprocating piston engines of the prior art have the inherent disadvantage of poor efficiency due to the loss of power in translating reciprocating motion of the pistons into rotary motion of the crankshaft because of misdirection of power forces through connecting rods and crank arms at other than an optimum 90° angle to the direction of eccentricity of the crankshaft during its rotation. Although the rotary type engines provide advantage over the reciprocating piston engines in weight reduction and more efficient generation of rotary motion to the crankshaft, such rotary engines have had a continuous problem of wear of the apices of the rotor and housing wall due to their continuous sliding contact to seal and separate the fluid chambers of the engine.

It is therefore an object of the present invention to provide an internal combustion, four-cycle engine construction which overcomes many of the disadvantages found in internal combustion engines of the prior art.

More specifically, it is an object of the present invention to provide an engine construction having more efficient transfer of combustion power forces to crankshaft rotation during each revolution of the crankshaft, with reduction of frictional wear on the relative moving surfaces of the engine, thereby providing a more efficient engine operation.

Broadly, the present invention comprises a four-cycle internal combustion engine including a housing defining a compartment having at least one peripheral lobe; and an inner body, or piston member, therein having a corresponding number of peripheral lobes with intervening peripheral recesses. The inner body is mounted for non-rotational, orbital movement within the compartment with each inner body lobe positioned for movement in its corresponding compartment lobe in response to combustion forces within the compartment.

The compartment housing, inner body, and a movable wall member disposed in each inner body recess cooperatively define one or more groups (depending upon the number of lobes in the housing compartment) of variable-volume fluid intake and compression, power, and exhaust chambers, and certain of each group of chambers periodically inter-communicate during orbital movement of the inner body to carry out the four-cycle operation. The inner body is eccenticly mounted with respect to the rotational axis of a power output shaft to impart rotary motion thereto, and the peripheral wall portion of each inner body lobe which forms a portion of each power chamber is configured so as to impart combustion forces at a substantially right angle to the direction of eccentricity of the inner body during the full fuel combustion and expansion cycle, thus providing move efficient transfer of combustion forces in the power chamber into rotational movement of the output shaft.

The above, as well as other objects of the present invention will become more apparent, and the invention will be better understood from the following detailed description of preferred embodiments of the invention, when taken together with the accompanying drawings, in which.

Figure 1:
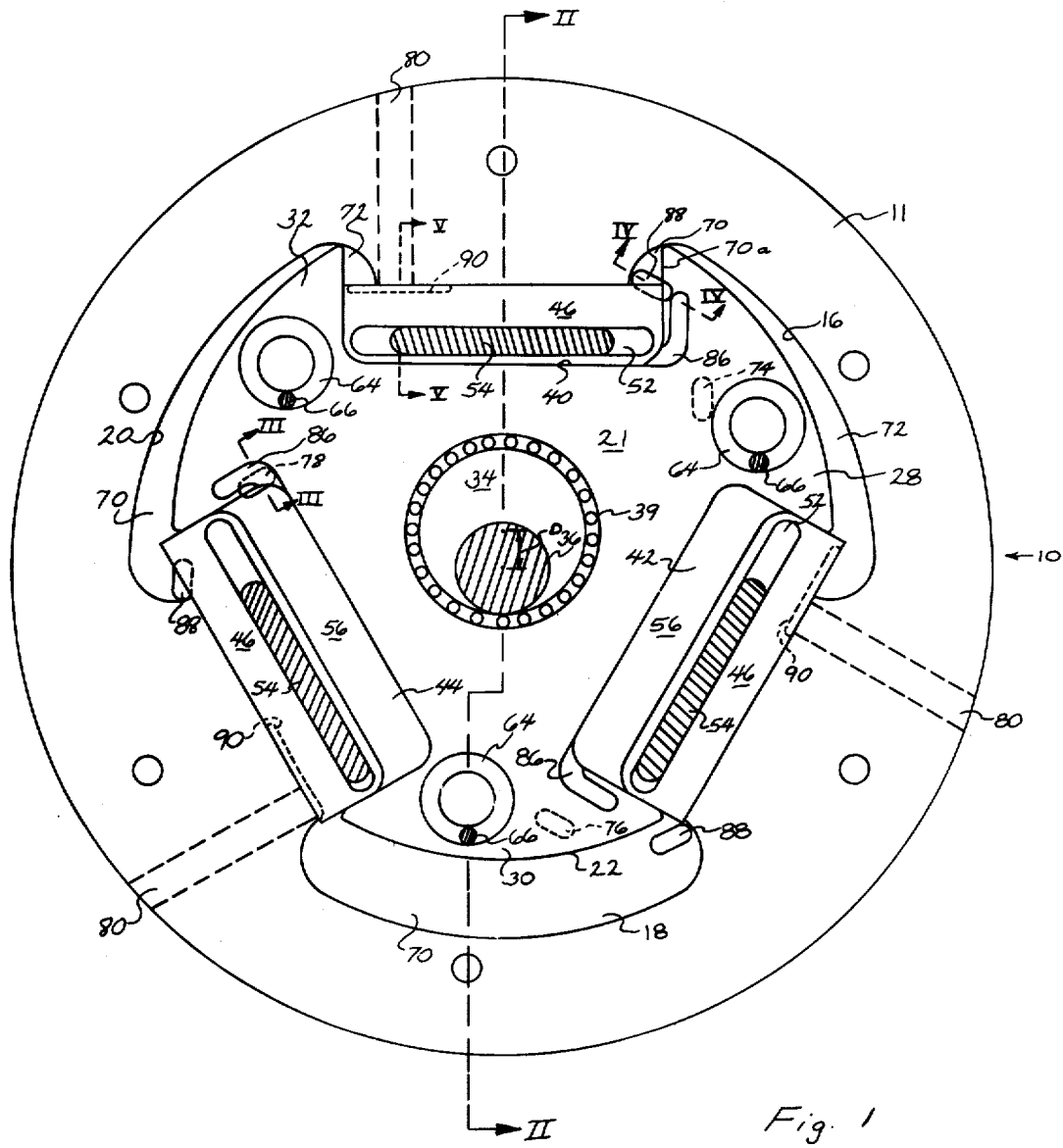
FIG. 1 is a schematic sectional end view of a multilobe, internal combustion engine of the present invention, taken generally along line I—I of FIG. 2, and showing the disposition and arrangement of the inner body piston member and movable wall members therein.
Figure 2:
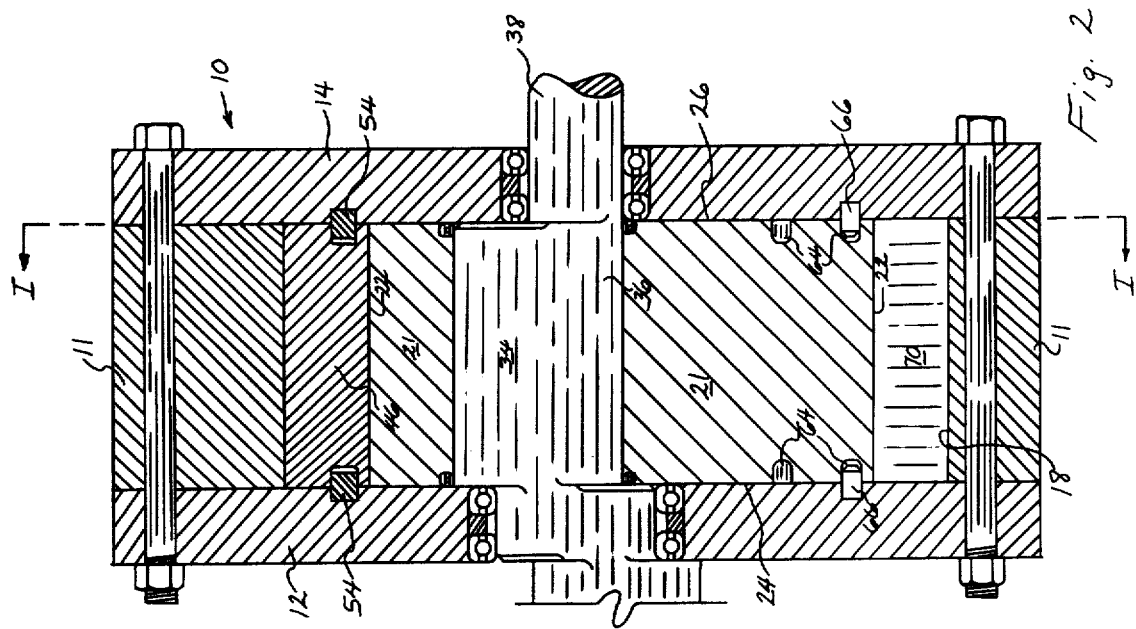
FIG. 2 is a sectional view of the internal combustion engine of FIG. 1, taken generally along line II—II thereof and looking in the direction of the arrows.

Referring more specifically to the drawings, FIGS. 1-5 illustrate one embodiment and form of the present invention wherein the internal combustion engine comprises three arcuately spaced groups of intake and compression, power and exhaust chambers, each of which groups cooperate to impart rotary motion to a power output shaft through non-rotational, orbital movement of an inner body piston member eccentrically mounted thereon. As best shown in FIGS. 1 and 2, the engine comprises a generally cylindrical housing 10 having an outer peripheral wall 11 and generally parallel end walls 12, 14 spaced by peripheral wall 11 along the longitudinal axis thereof to define an internal compartment in the housing. The inner surface of peripheral wall 11 defines three outer lobes 16, 18, 20 of the compartment which are equally spaced about its periphery.

Located within the compartment is an inner body, or piston member, 21 having a peripheral wall surface 22 and spaced parallel end wall surfaces 24, 26 which sealingly engage respective adjacent end walls 12, 14 of the housing compartment. Inner body 21 also has a plurality of spaced peripheral lobes 28, 30, 32 corresponding in number to the compartment lobes, and the inner body is mounted for clockwise, non-rotational, orbital movement within the housing compartment on the eccentric portion 34 of a main crankshaft 36. Crankshaft 36 is supportably mounted by bearings in housing end walls 12,14 for clockwise rotation about an axis parallel to and coincident with the longitudinal axis of the housing compartment, and an output shaft portion 38 (FIG. 2) of the crankshaft extends through an opening in the end wall 14 of the housing. As seen in FIG. 1, inner body 21 is disposed in the compartment so that each of its peripheral lobes 28, 30, 32 is positioned for movement into a corresponding one of the compartment lobes 16, 18, 20 during non-rotational, orbital movement of inner body 21.

Inner body 21 is mounted on the eccentric portion 34 of crankshaft 36 by roller bearings 39 so that the eccentric portion is free to rotate within the opening through the inner body 21 during rotation of the crankshaft. The central axis of eccentric portion 34 is displaced from the rotational axis of the output shaft by a distance, D, and the direction of eccentric displacement is hereinafter referred to as the crank angle.

Inner body 21 also is provided with peripheral recesses 40, 42, 44, each of which is located between an adjacent pair of inner body lobes and extends generally between adjacent pairs of compartment lobes. Disposed for movement within each inner body recess is a movable wall member 46, opposite surfaces of each of which has a central elongate groove 52. Each movable wall member 46 is mounted on housing end walls 12, 14 by spline elements 54 which are received in grooves 52 so that each member 46 moves radially inward and outward of its inner body recess in response to orbital movement of the inner body to define, with the inner body and housing, an inner variable-volume fluid intake and compression chamber 56 in each recess (two of which can be seen in an expanded condition in the position of the inner body shown in FIG. 1). The splines 54 and grooves 52 of each movable wall member also provide for alternating, endwise sliding movement of each wall member toward and away from the ends of its adjacent compartment lobes in response to orbital movement of the inner body, for a purpose to be explained. The movable wall members 46 mounted on housing 10 sealingly engage side walls of each inner body peripheral recess to prevent rotational movement of the inner body during its orbital movement within the housing compartment, as well as form the intake and exhaust chamber in each recess.

To further ensure non-rotational movement of the inner body during its orbital movement in the housing compartment, anti-rotation means may be provided in end walls 24, 26 of the inner body 21 and the adjacent housing end walls 12,14. As seen in FIGS. 1 and 2, the anti-rotation means comprise three spaced, circular grooves 64 in each end wall 24, 26 of the inner body. Received in each groove 64 for movement therealong is a pin 66 which is attached to and extends from respective adjacent housing end walls 12,14. During orbital movement of the inner body 21 in the housing compartment, the housing end wall pins 66 move in their respective inner body grooves 64 to prevent any rotational movement of the inner body in the compartment, thus further ensuring positive sealing engagement of peripheral wall portions of each inner body lobe with peripheral wall portions of its corresponding compartment lobe, as will be explained.

As best seen in FIG. 1, the peripheral wall of each inner body lobe cooperates with the peripheral and end walls of the housing, and with wall portions of each movable wall member to form an outer, variable-volume chamber in each compartment lobe 16, 18, 20. Each outer chamber is periodically subdivided into a power chamber 70 and an exhaust chamber 72 during a portion of the orbital movement of the inner body in the following manner. During clockwise, orbital movement of inner body 21 about the rotational axis of crankshaft 36, every point on inner body 21 describes a circular path having a radius equal to the distance, D, (FIG. 1) between the rotational axis of shaft 36 and the central axis of eccentric portion 34 on which the inner body is mounted. It can thus be appreciated that during every complete orbit of the inner body and 360° of rotation of the output shaft, each inner body lobe moves in a circular path, having a radius of D, into and out of its corresponding compartment lobe. During this movement into the compartment lobe, successive points along the periphery of each inner body lobe in the direction of orbital movement of the inner body progressively engage successive points along the peripheral wall of its compartment lobe to form a positive seal, subdividing the compartment lobe outer chamber into power chamber 70 and exhaust chamber 72. Each of the power and exhaust chambers so formed continuously vary in volume during orbital movement of the inner body. In the position of the inner body shown in FIG. 1, it can be seen that outer compartment lobes 16 and 20 are each momentarily subdivided into a power chamber 70 and an exhaust chamber 72, while outer compartment lobe 18 is momentarily a fully expanded power chamber 70, as will be explained.

Housing 10 is provided with intake port means comprising three pairs of fluid intake ports 74, 76, 78, with each pair being located in opposed, aligned relation in end walls 12, 14 of the housing. Each pair of intake ports communicate with the housing compartment at a position adjacent a respective compartment lobe and one end of a peripheral recess in the inner body. The housing compartment is further provided with exhaust port means comprising three fluid exhaust ports 80 (FIGS. 1 and 5) in the peripheral wall of the housing, one being located between each adjacent pair of compartment lobes.

Figure 3:
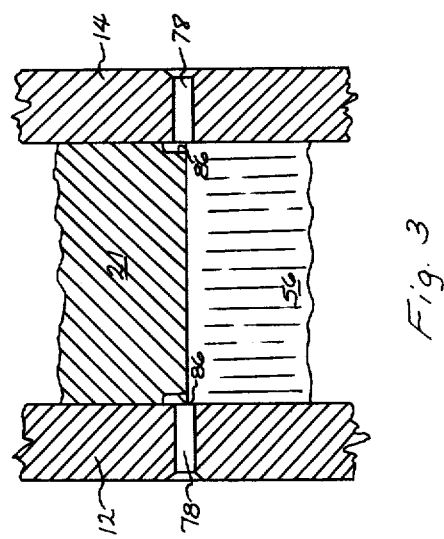
FIG. 3 is an enlarged partial sectional view of the engine of FIG. 1 taken generally along line III—III thereof and looking in the direction of the arrows.
Figure 4:
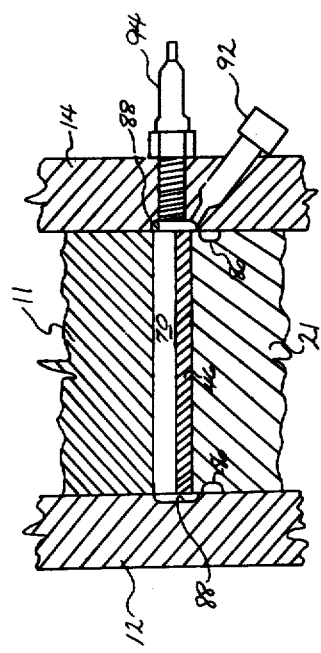
FIG. 4 is an enlarged partial sectional view of the engine of FIG. 1 taken generally along line IV—IV thereof and looking in the direction of the arrows.

Passageway means are provided for communicating each fluid intake and compression chamber 56 with a pair of intake ports during a portion of orbital movement of the inner body, and thereafter with the next adjacent power chamber thereto in the direction of orbital movement of the inner body. As seen in FIGS. 1, 3 and 4, extending from the right end of each inner body recess 40, 42, 44 in the surface of each inner body end wall 24, 26 is a generally elongate groove 86, each pair of which communicate with the respective inner body recess and the intake and compression chamber formed therein.

As seen in FIGS. 1 and 4, the inner surface of each housing end wall 12, 14 is also provided with a groove 88 adjacent and extending into the left hand end of each compartment lobe 16, 18, 20, each opposed pair of which are periodically engaged by an adjacent pair of elongate grooves 86 in the inner body to provide communication between the compression chamber in each inner body recess with its next adjacent power chamber 70 in the direction of orbital movement of the inner body. Thus during orbit of the inner body in the housing compartment, each pair of elongate grooves 86 communicating with an inner body recess move in a clockwise circular path to first overlie an adjacent pair of inlet ports to intake fluid as the inner body recess chamber is expanding (note chamber 56 in recess 44 of FIG. 1). Thereafter, each pair of grooves 86 move in its circular path to overlie a respective pair of housing end wall grooves 88 in the adjacent compartment lobe power chamber 70 to pass compressed fluid into the power chamber as the movable wall member 46 moves inwardly in the recess to compress the fluid in the chamber formed therein.

Figure 5:
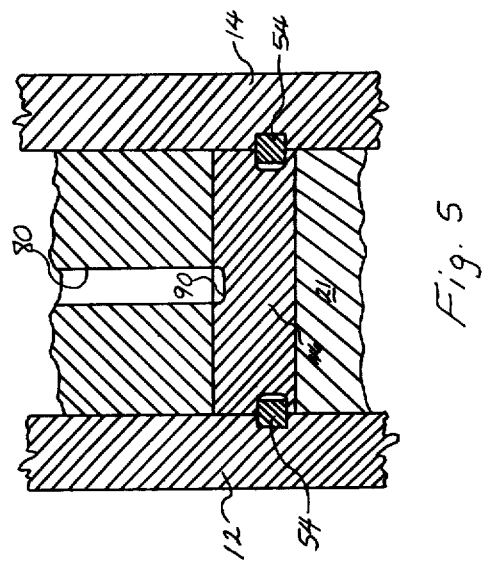
FIG. 5 is an enlarged partial sectional view of the engine of FIG. 1 taken generally along line V—V thereof and looking in the direction of the arrows.

As best seen in FIGS. 1 and 5, the outer face of each movable wall member 46 is provided with an elongate groove 90 located adjacent the right hand end of each compartment lobe 16, 18, 20. Upon complete expansion of each power chamber in each compartment lobe (as indicated by chamber 70 in compartment lobe 18, FIG. 1), and in response to continued orbital movement of the inner body, each movable wall member 46 will slide endwise on spline elements 54 so that its groove 90 overlies the compartment lobe to form and communicate an exhaust chamber 72 in the lobe with the exhaust port 80 located adjacent thereto. (Note exhaust chambers 72 in compartment lobes 16 and 20). In this manner, expanded gases of combustion are discharged from the exhaust chamber 72 and from the engine housing.

Fuel for combustion in each of the three power chambers of the engine may be supplied by conventional gas carburetion with the intake air supplied to each of the intake chambers through intake ports 74, 76, 78. Alternatively, fuel may be injected directly into the compressed air in the power chamber at the beginning of the power cycle. As illustrated in FIG. 4, communicating with the left end portion of each of the compartment lobes 16, 18, 20 through a side wall of the compartment housing is a fuel injection port 92 for introducing fuel into the power chamber formed in each compartment lobe.

Also communicating with the left end of each compartment lobe and power chamber are suitable means for igniting the fuel in the power chamber in each lobe. If the engine of the present invention is to be employed as a gasoline combustion engine, a spark plug 94 may be provided to communicate with the power chamber, as shown in FIG. 4. If the engine of the present invention is to be employed as a diesel engine, suitable means, such as a glow plug may be provided for initial combustion of the diesel fuel injected into the power compartment. Conventional timing means, not shown, may be employed to sequence fuel injection and spark ignition in each power chamber 70.

The present invention may be better understood by a brief explanation of the operation of the three lobe embodiment of internal combustine engine shown in FIGS. 1-5. Referring to FIG. 1, it can be seen that the housing compartment lobes 16, 18 and 20 are equally arcuately spaced about the central axis of the housing compartment at 120° intervals, and the inner body lobes 28, 30, 32 are similarly spaced at 120° intervals about the central axis of the inner body. During clockwise rotation of the crankshaft, inner body 21 moves in a clockwise orbital path, with every point on the inner body describing a circular path having a radius equal to the distance of eccentricity, D, of the inner body axis from the axis of rotation of the crankshaft. Thus, during each 360° rotation of the crankshaft and full orbit of the inner body, each lobe of the inner body moves in a circular path into and out of its corresponding compartment lobe, with consecutive wall portions along the periphery of the inner body lobe sequentially engaging consecutive peripheral wall portions of the compartment lobe to divide the same into a power chamber and an exhaust chamber.

At the same time, the movable wall element 46 in each inner body recess moves inwardly and outwardly thereof once during each 360° revolution of the crankshaft to fully expand and collapse the intake and compression chamber 56 formed therein. During expansion, chamber 56 communicates with the inlet ports. Thereafter, chamber 56 communicates with the next adjacent power chamber 70 to pass compressed fluid thereinto during the latter portion of the compression stroke, i.e., as the movable wall member 46 moves radially inward in the inner body recess.

In the position of inner body 21 shown in FIG. 1, it can be seen that the intake and compression chamber in recess 40 is fully collapsed after the compression cycle, compressed fluid therefrom has been passed into the adjacent power chamber 70 in compartment lobe 16, and grooves 86 have just passed out of communication with grooves 88 so that power chamber 70 containing compressed fluid is sealed for initiation of combustion. Immediately upon combustion, it can be seen that the combustion force in power chamber 70 acts on a peripheral wall surface 70a of inner body lobe 28 which is substantially parallel to the crank angle of the crankshaft. Thus, the combustion and expansion force is applied to the inner body 21 and crankshaft 36 at a right angle to the crank angle to provide optimum transfer of force to impart rotation to the output shaft of the engine.

As the inner body lobe 28 moves further clockwise in compartment lobe 16, the power chamber 70 will progressively expand during combustion to a position as is illustrated by power chamber 70 in compartment lobe 20. In this position of the power cycle, it can be seen that the peripheral wall surface of the inner body lobe on which the force of combustion is applied still lies substantially parallel to the crank angle of the crankshaft, thus continuing a right angle application of force thereto throughout the major portion of the power cycle of each power chamber.

Fuel combustion in each power chamber in each compartment lobe of the engine causes the power chamber to expand to its maximum dimensions through 240° of rotation of the crankshaft. The position of the inner body lobe with respect to the housing lobe when the power chamber is fully expanded is illustrated by the compartment lobe 18 and the adjacent inner body lobe 30. Continued clockwise movement of the inner body lobe from fully expanded power cycle position causes movable wall member 46 to slide sideways over the end portion of the compartment lobe to communicate the chamber therein with exhaust port 80 by way of groove 90, thus forming an exhaust chamber 72 which progressively collapses to expel fluid from the housing. Although not shown, it is to be understood that suitable passages may be provided in the housing and inner body for circulation of a fluid cooling medium for the engine.

Figure 6:
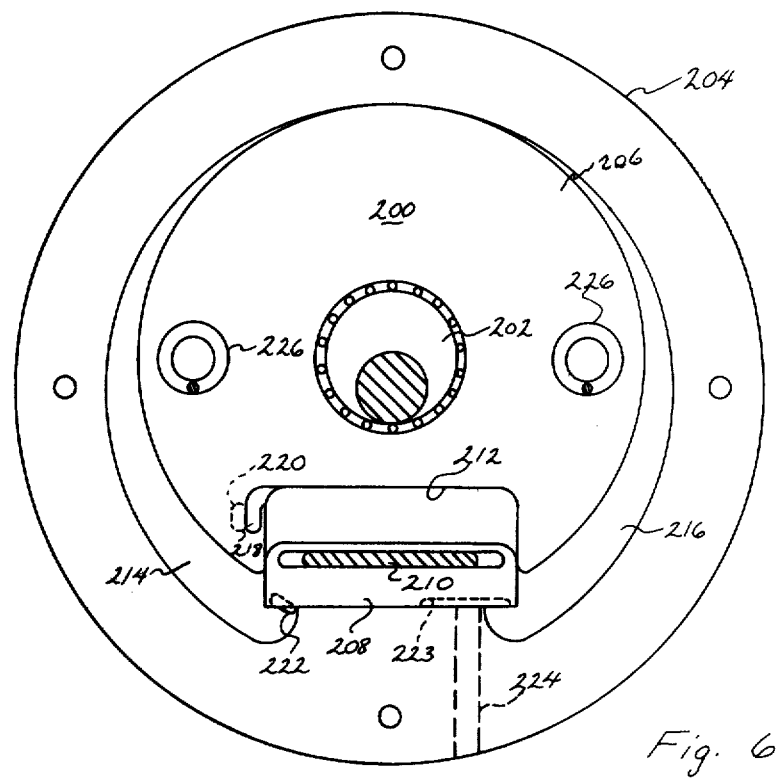
FIG. 6 is a schematic sectional end view of a single housing compartment lobe embodiment of the internal combustion engine of the present invention showing the disposition of the inner body and movable wall member in the housing compartment.

Although the invention shown in FIGS. 1-5 illustrates a three-lobe engine with three power cycles being initiated during each crankshaft revolution, it is to be understood that the engine of the present invention may comprise any number of compartment and inner body lobes with corresponding power cycles per crankshaft revolution, depending upon its size, weight, and power requirements of the engine. FIG. 6 illustrates schematically a one lobe engine embodiment of the invention wherein a single lobe inner body 20 is eccentrically disposed for non-rotational, orbital movement on a crankshaft 202 in a housing 204 having a single peripheral compartment lobe. Disposed between opposite ends of the inner body lobe 206 and the housing lobe is a movable wall member 208 which is mounted on the housing by spline element 210 for radial movement into and out of inner body peripheral recess 212 and for alternating endwise movement to overlie end portions of the housing compartment lobe in response to orbital movement of the inner body, in the same manner as a movable wall member of FIGS. 1–5. Thus during orbital movement of inner body 200, peripheral wall portions of the inner body sequentially engage peripheral wall portions of the housing compartment to form a variable volume power chamber 214 and exhaust chamber 216 therein. Also, during inner body movement, the variable volume intake and compression chamber formed in inner body recess 212 alternately communicates by way of passageway grooves 218 with intake ports 220 (only one of each shown), and then with power chamber 214 through grooves 222 (only one shown) to intake fluid and to pass compressed fluid to the power chamber, as in the three-lobe embodiment of FIGS. 1–5.

As can be seen, the movable wall member 208 is provided with an outer wall groove 223 to permit communication of exhaust chamber 216 with exhaust port 224 in the housing wall to discharge expanded gases of combustion therefrom during the four-cycle operation of the engine. In the one lobe embodiment of in FIG. 6, it can be seen that combustion and expansion of the gases in power chamber 214 occurs through approximately 360° of crankshaft rotation. Anti-rotation devices 226 of the type shown in the embodiment of FIGS. 1–5 may be utilized to ensure non-rotational movement of the inner body during its orbital movement in housing 204. Although not shown, fuel injection means and suitable spark initiation means may be employed in the end portion of power chamber 214 to introduce fuel into the chamber and ignite same during the combustion and power stroke of the engine.

Figure 7:
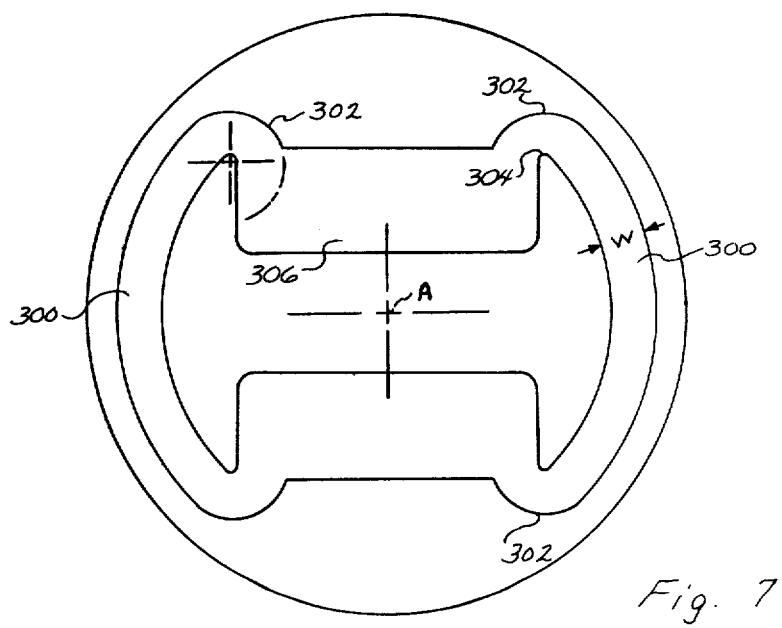
FIG. 7 is a schematic representation of the manner in which component parts of the engine may be machined from metal stock material.

As can be appreciated, the curvature of the peripheral wall of each inner body lobe and its corresponding compartment lobe are so shaped as to ensure sealing engagement of the peripheral inner body lobe wall with the peripheral compartment lobe wall during orbital movement of the inner body. In practice, this may be accomplished by machining an inner body and peripheral housing wall from a single metal cylinder, or block of material. As illustrated by a two lobe engine embodiment in FIG. 7, the peripheral wall of a compartment housing an inner body may be formed simultaneously by cutting a sinuous pathway 300 about a common axis A through the stock material, the width W of the pathway 300 being equal to the desired distance of eccentricity at which the inner body is to be mounted on a crankshaft from its axis of rotation. The radius of curvature of the end portions 302 of the compartment lobes are correspondingly cut about a radius equal to the distance of eccentricity plus the radius of curvature of the tip portion 304 of the inner body lobes. In this manner, sealing engagement of the inner body lobes with the compartment peripheral wall is ensured during orbital movement of the inner body in the housing. The depth of each inner body peripheral recess 306 must be twice in the distance of eccentricity, or slightly greater.

Although the engine of the present invention has been shown and described as having a single housing compartment with inner body therein, it can be appreciated that the engine may be composed of multiple compartmenst with inner bodies positioned along the length of a crankshaft in similar fashion as the pistons of a conventional reciprocating piston engine. If the engine is to be composed of a plurality of compartments and inner bodies eccentrically mounted on the crankshaft, it will be understood that the intake and exhaust port means of each compartment would be suitably channeled to the exterior of the housing through the end walls to the peripheral wall thereof.

Although the embodiments of the invention shown and described in the drawings and specification employ plural pairs of passageways and intake ports for introducing fluid into each intake chamber and passing fluid from the intake chamber to the power chamber after compression, only one intake port and set of cooperating passageways may be utilized, if desired. The exact construction and arrangement of the passageways may be varied depending upon the number of inner body piston means and housing compartments utilized on a single crankshaft for the engine power output required.

That which is claimed is:

1. An internal combustion engine comprising:
   (a) a housing defining an internal compartment having at least one peripheral lobe;
   (b) An inner body having at least one peripheral lobe thereon, means mounting said inner body in said compartment for non-rotational, orbital movement with said inner body lobe disposed for movement within said housing lobe during at least a portion of orbital movement;
   (c) a recess in the periphery of said inner body adjacent said inner body lobe, a movable wall member disposed in said recess, and means mounting said movable wall member for movement in said recess and for movement toward an end of said compartment lobe in response to orbital motion of said inner body;
   (d) portions of said movable wall member, inner body, and housing sealingly engaging each other to define a variable-volume fluid intake and compression chamber in said compartment, and to define a variable-volume power chamber and a variable-volume fluid exhaust chamber in said compartment lobe during at least a portion of orbital movement of said inner body;
   (e) intake port means and exhaust port means in said housing communicating with said compartment; and passageway means communicating
      (1) said intake and compression chamber with said intake port means,
      (2) said intake and compression chamber with said power chamber, and
      (3) said exhaust chamber with said exhaust port means during at least some portions of orbital movement of said inner body; and
   (f) a power output shaft, and means operatively connecting said inner body with said power output shaft to impart rotational movement thereto during orbital movement of said inner body.

2. An internal combustion engine as defined in claim 1 wherein said housing defines a peripheral wall and a pair of parallel end walls of said compartment, with said end walls spaced apart by said peripheral wall along the longitudinal axis thereof, said inner body comprises an outer peripheral wall and a pair of parallel outer end walls spaced apart by said inner body peripheral wall along the longitudinal axis thereof, said longitudinal axis of said compartment peripheral wall being parallel to said longitudinal axis of said inner body peripheral wall with respective inner body end walls sealingly engaging adjacent compartment end walls, said intake port means comprises an intake port in one compartment end wall and said exhaust port means comprises an exhaust port in the compartment peripheral wall; and said passageway means comprises a first generally elongate groove in the inner body end wall engaged with said one compartment end wall and communicating with said variable-volume fluid intake and compression chamber, a second groove in said one compartment end wall communicating with said power chamber, and a third groove in the surface of said movable wall member, said first groove communicating said intake port with said intake and compression chamber during a first portion of orbital movement of the inner body to introduce fluid into said compression chamber and communicating with said second groove during a second portion of orbital movement of the inner body to pass compressed fluid from said intake and compression chamber into said power chamber, and said third groove communicating said exhaust chamber with said exhaust port means to discharge expanded fluid from said exhaust chamber at least during a portion of orbital movement of said inner body.

3. An internal combustion engine comprising:
(a) a housing defining an internal compartment having a plurality of compartment lobes spaced about the periphery of the compartment;
(b) an inner body having a corresponding plurality of spaced peripheral lobes each separated by a peripheral recess in said inner body;
(c) means mounting said inner body in said housing compartment for non-rotational, orbital movement with each inner body lobe disposed for movement into its corresponding compartment lobe and with an inner body recess extending between each adjacent pair of compartment lobes during orbital movement;
(d) a movable wall member disposed in each recess and mounted for movement in said recess and for movement toward and away from end portions of adjacent compartment lobes in response to orbital movement of said inner body;
(e) said movable members, and inner body sealably engaging each other to define a first variable-volume fluid intake and compression chamber between each adjacent pair of compartment lobes and to define a second variable-volume chamber in each compartment lobe, and a peripheral wall portion of each inner body lobe periodically sealably engaging a peripheral wall portion of its corresponding compartment lobe during orbital movement of the inner body to subdivide each second chamber into a variable-volume power chamber and a variable-volume exhaust chamber;
(f) intake port means and exhaust port means in said housing communicating with said compartment;
(g) passageway means in said engine communicating
  (1) each of said first chambers with said intake port means,
  (2) each of said first chambers with a corresponding adjacent power chamber, and
  (3) each of said exhaust chambers with said exhaust port means
during at least some portions of orbital movement of said inner body;

(h) a power output shaft; and
(i) means operatively connecting said inner body to said output shaft to impart rotational movement thereto during orbital movement of said inner body.

4. An internal combustion engine as defined in claim 3 wherein said housing defines a peripheral wall and a pair of parallel end walls of said compartment, with said end walls spaced apart by said peripheral wall along the longitudinal axis thereof; said inner body comprises an outer peripheral wall and a pair of parallel outer end walls spaced apart by said inner body peripheral wall along the longitudinal axis thereof; the inner body being disposed in said housing with the longitudinal axis of said inner body peripheral wall parallel to the longitudinal axis of said compartment peripheral wall, the rotational axis of said power output shaft extending parallel to said longitudinal axes; said means connecting said inner body to said output shaft comprises an eccentric portion of said shaft disposed within said compartment and having a central axis displaced from and parallel to said rotational axis, and bearing means mounting said inner body on said eccentric portion for rotational movement of said power output shaft during orbital movement of the inner body in said compartment; and the peripheral wall of each inner body lobe defines a wall portion of said power chamber which extends generally parallel to the direction of displacement of said eccentric portion of said shaft from the rotational axis of said shaft during orbital movement of said inner body.

5. An internal combustion engine as defined in claim 4 including means on said housing for introducing combustible fuel into each of said power chambers for combustion therein to impart force to said peripheral wall portion of said inner body defining a portion of said power chamber.

6. An internal combustion engine as defined in claim 4 wherein each inner body end wall sealingly engages its adjacent compartment end wall during orbital movement of said inner body in said compartment; said intake port means comprises an intake port in at least one compartment end wall positioned adjacent an end of each compression chamber and its next adjacent power chamber in the direction of orbital movement of said inner body; said exhaust port means comprises an exhaust port in said compartment peripheral wall between each adjacent pair of compartment lobes; and said passageway means comprises a plurality of first generally elongate grooves in the inner body and end wall engaged with said one compartment end wall, with each first groove communicating with a respective one of said fluid intake and compression chambers, a plurality of second grooves in said one compartment end wall with each second groove communicating with a respective power chamber, and a third groove in the surface of each of said movable wall members; each first groove communicating a respective intake port with an intake and compression chamber during a first portion of orbital movement of the inner body to introduce fluid into said intake and compression chamber and communicating with a respective second groove during a second portion of orbital movement of the inner body to pass compressed fluid from each intake and compression chamber into a respective power chamber, and each third groove communicating an exhaust chamber with its respective exhaust port to discharge expanded fluid from each of said exhaust chamber during at least a portion of orbital movement of said inner body.

* * * * *